(No Model.) 11 Sheets—Sheet 2.

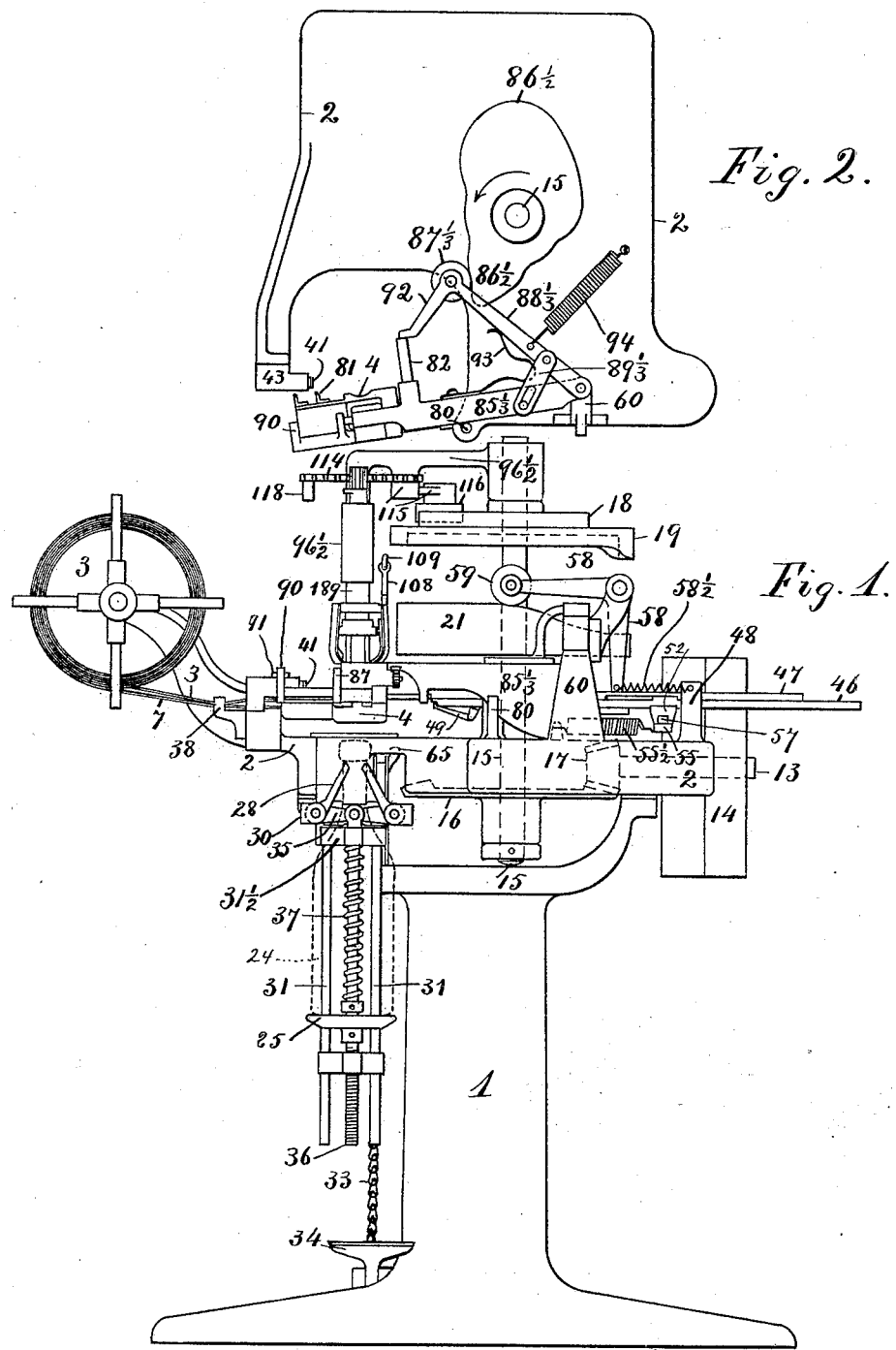

B. ADRIANCE.
MACHINE FOR WIRING CORKS IN BOTTLES.

No. 405,688. Patented June 25, 1889.

Attest:
L. Lee.
F. C. Fischer.

Inventor.
B. Adriance, per
Francis Miller atty.

(No Model.) 11 Sheets—Sheet 3.

B. ADRIANCE.
MACHINE FOR WIRING CORKS IN BOTTLES.

No. 405,688. Patented June 25, 1889.

Attest:
L. Lee.
F. C. Fischer.

Inventor.
B. Adriance, per
Crane & Miller, Attys.

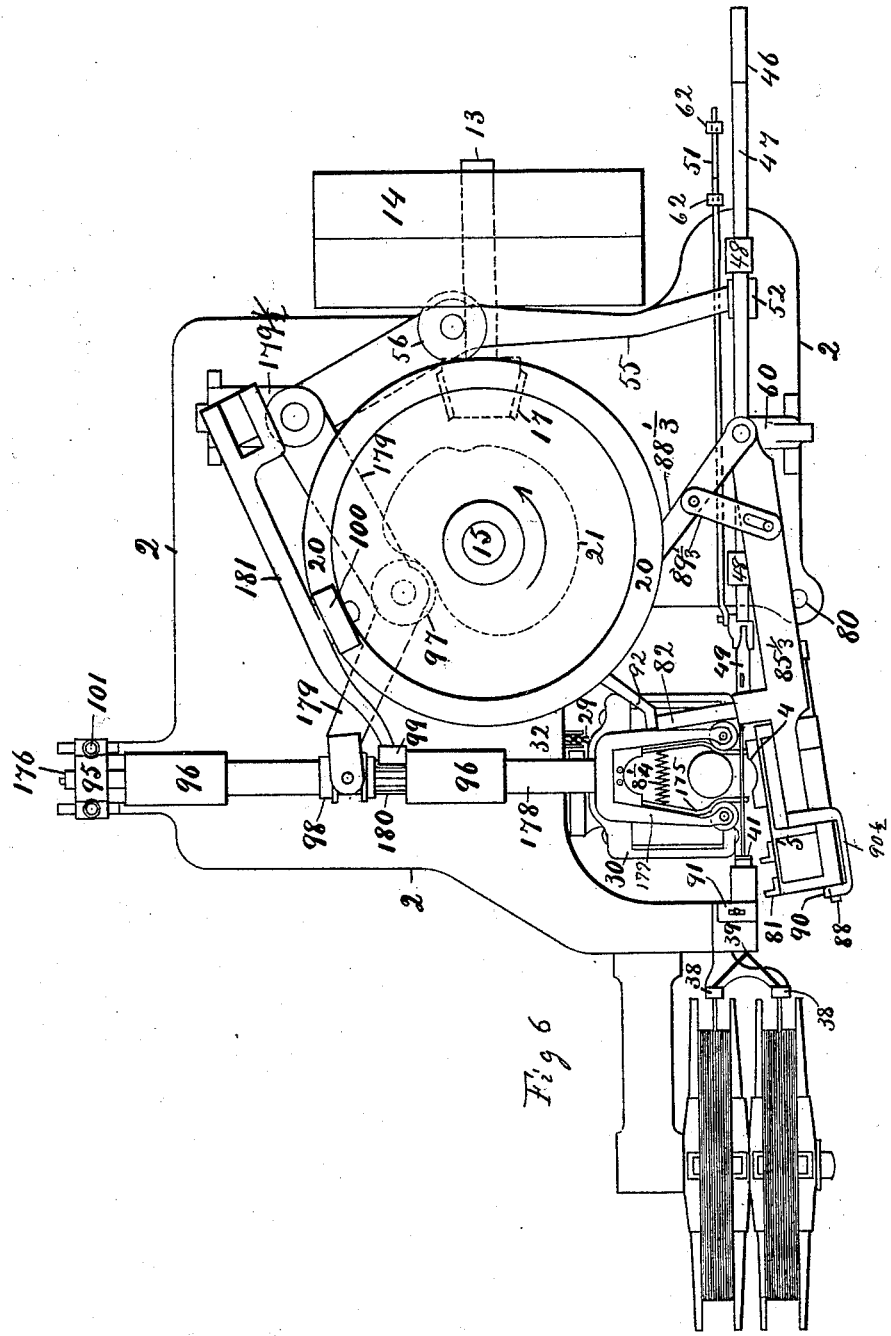

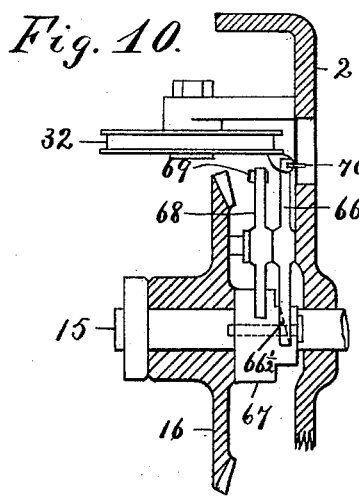
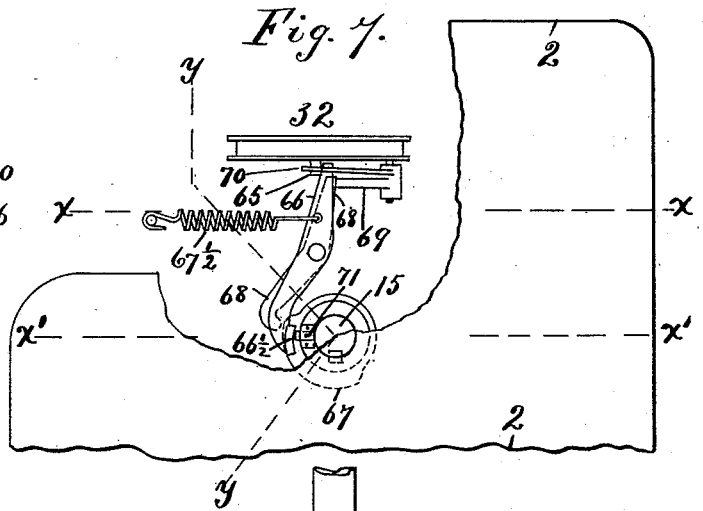
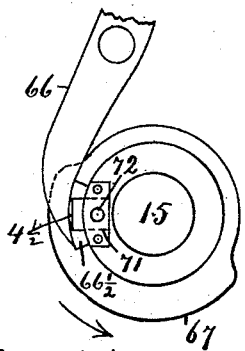
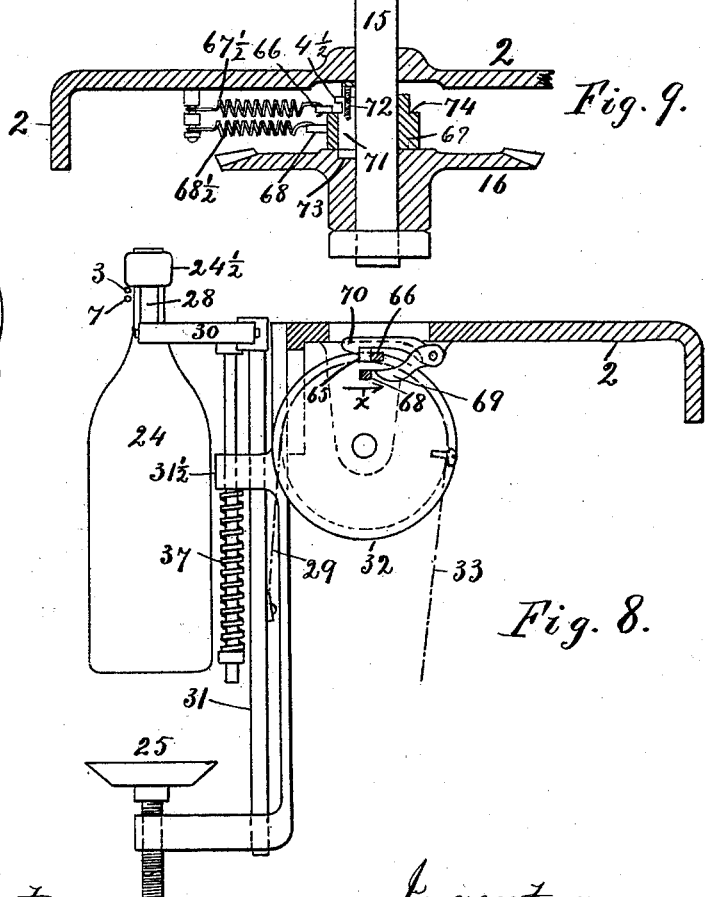

(No Model.) 11 Sheets—Sheet 6.

B. ADRIANCE.
MACHINE FOR WIRING CORKS IN BOTTLES.

No. 405,688. Patented June 25, 1889.

Attest:
L. Lee.
F. C. Fischer.

Inventor:
B. Adriance, per
Burns Miller, Atty.

(No Model.)  11 Sheets—Sheet 7.
B. ADRIANCE.
MACHINE FOR WIRING CORKS IN BOTTLES.
No. 405,688.  Patented June 25, 1889.
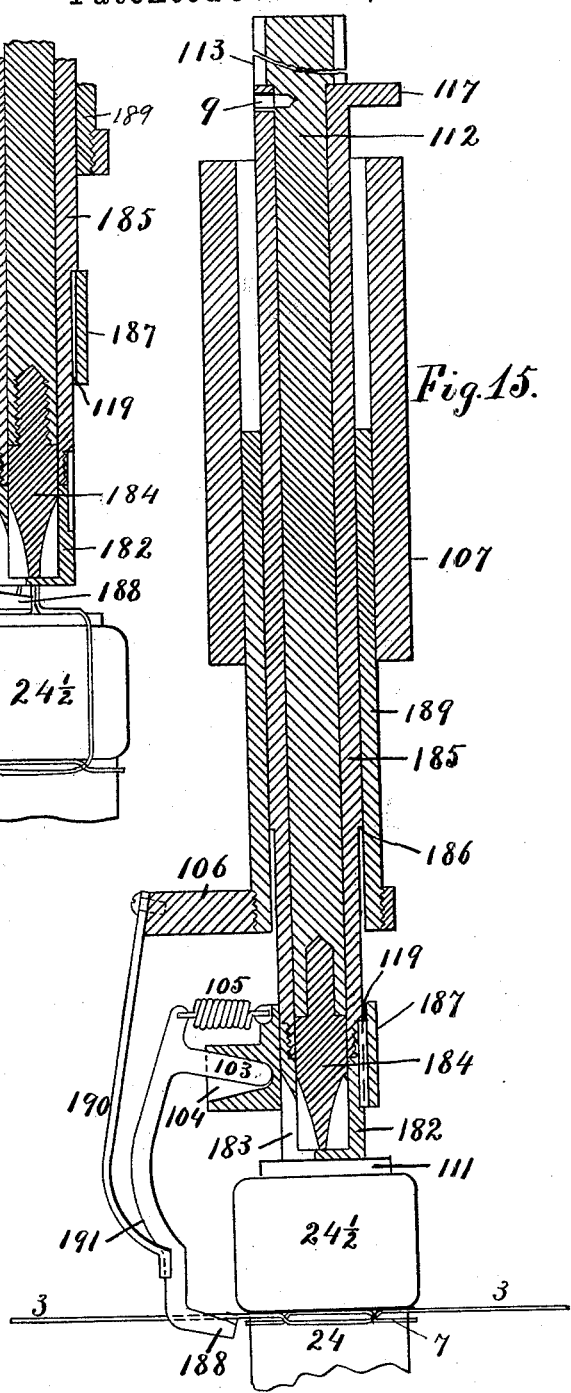
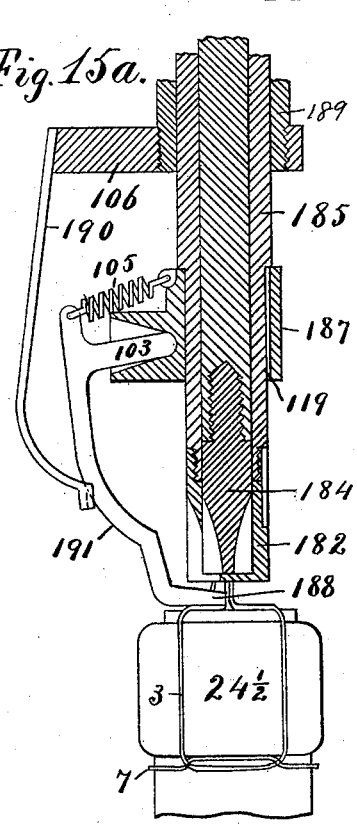
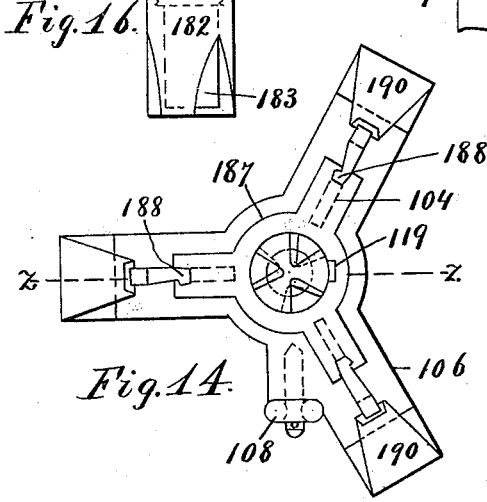
Attest:
L. Lee.
F. C. Fischer.
Inventor.
B. Adriance, per
Crane & Miller, Atty.
N. PETERS, Photo-Lithographer, Washington, D. C.

(No Model.) 11 Sheets—Sheet 8.

B. ADRIANCE.
MACHINE FOR WIRING CORKS IN BOTTLES.

No. 405,688. Patented June 25, 1889.

Attest:
L. Lee.
F. C. Fischer.

Inventor.
B. Adriance, per
Crane & Miller, attys.

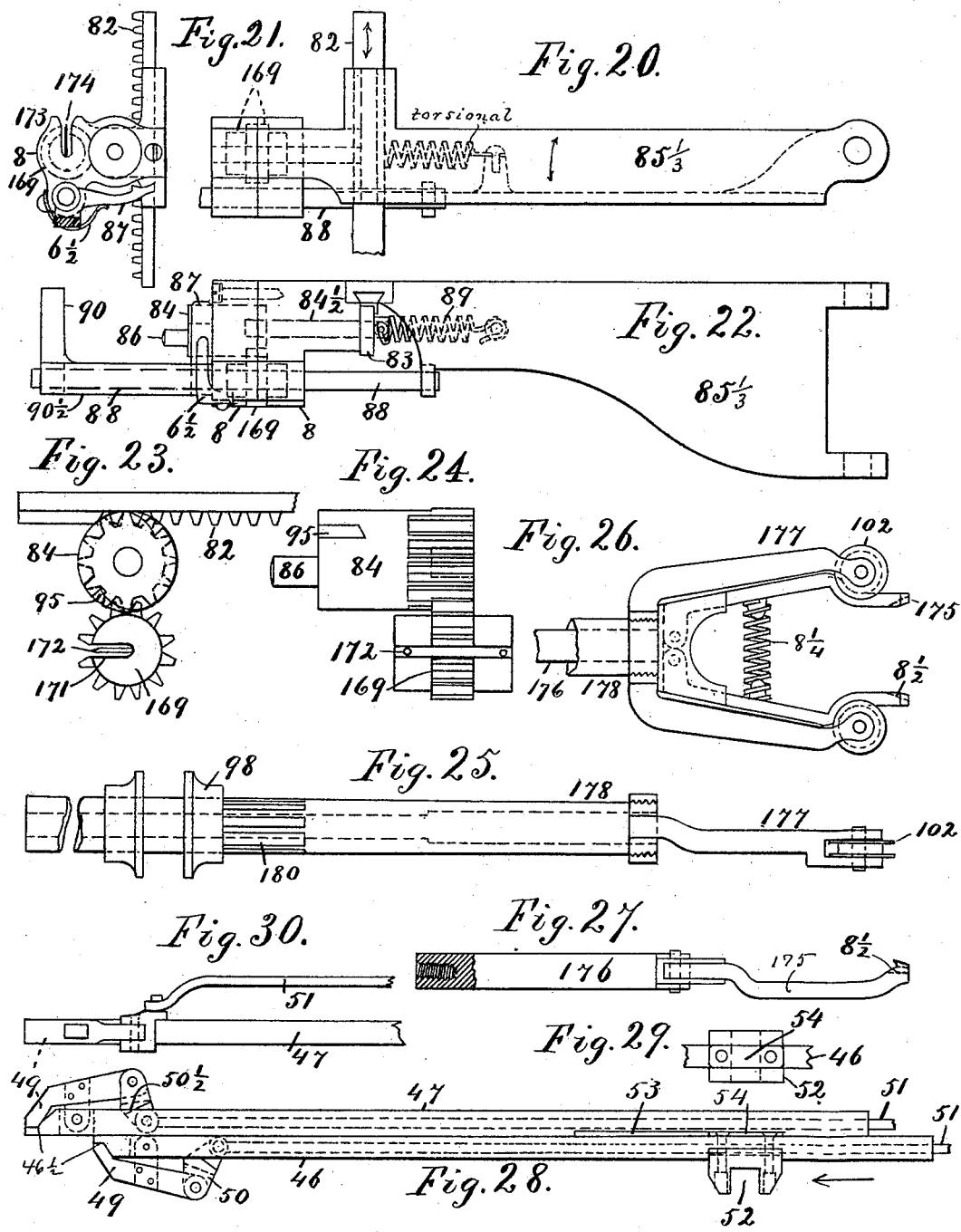

(No Model.) 11 Sheets—Sheet 10.

B. ADRIANCE.
MACHINE FOR WIRING CORKS IN BOTTLES.

No. 405,688. Patented June 25, 1889.

Attest:
L. Lee.
F. C. Fischer.

Inventor.
B. Adriance, per
Crane & Miller, Attys.

N. PETERS, Photo-Lithographer, Washington, D. C.

(No Model.) 11 Sheets—Sheet 11.
B. ADRIANCE.
MACHINE FOR WIRING CORKS IN BOTTLES.
No. 405,688. Patented June 25, 1889.
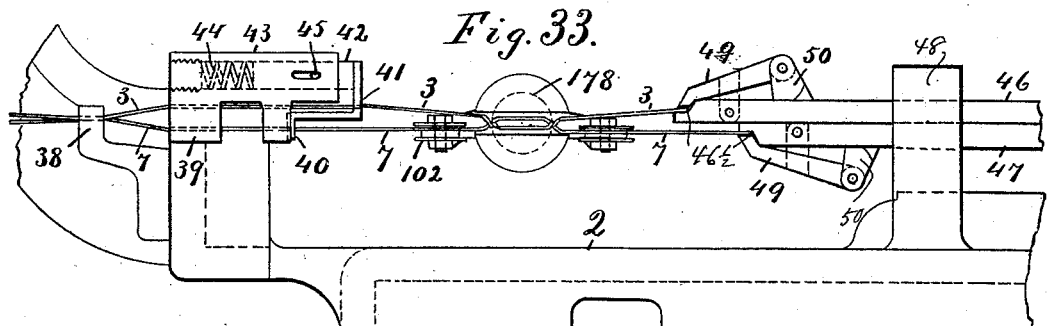
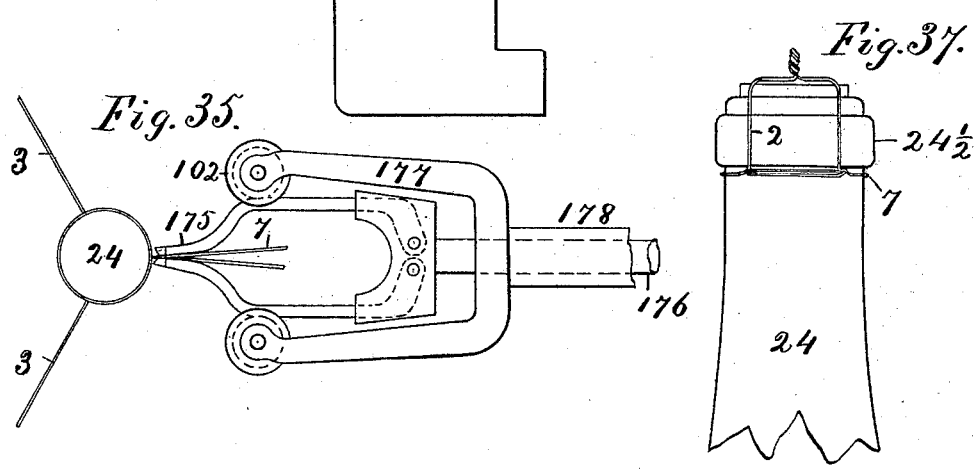
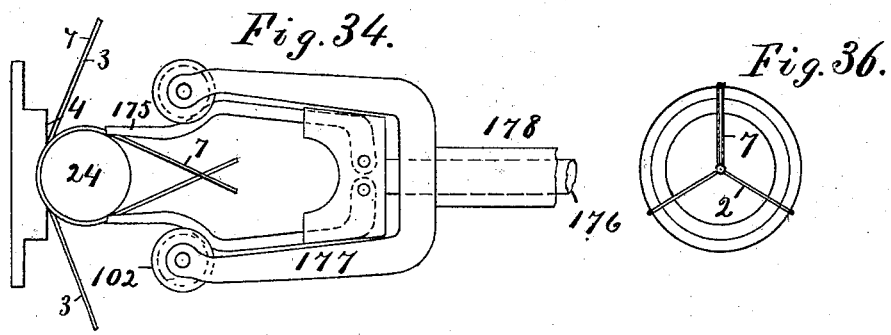
Attest:
F. C. Fischer
L. Lee.
Inventor.
B. Adriance, per
Crane & Miller, Att'ys.

UNITED STATES PATENT OFFICE.

BENJAMIN ADRIANCE, OF BROOKLYN, NEW YORK.

MACHINE FOR WIRING CORKS IN BOTTLES.

SPECIFICATION forming part of Letters Patent No. 405,688, dated June 25, 1889.

Application filed September 5, 1888. Serial No. 284,633. (No model.)

*To all whom it may concern:*

Be it known that I, BENJAMIN ADRIANCE, a citizen of the United States, residing at Brooklyn, Kings county, New York, have invented certain new and useful Improvements in Machines for Wiring Corks in Bottles, fully described and represented in the following specification and the accompanying drawings, forming a part of the same.

The object of this invention is to furnish a device that will secure corks in bottles by means of wires of suitable length, which it will draw from reels, twist together adjacent to the middle, cut them off, wind one of such wires about the neck of the bottle, twist it upon the other side, gather the same, with the opposite ends of the other wire, over the top of the bottle, twist them together over the cork, and cut off the surplus material.

The invention consists in the combinations of mechanism hereinafter fully set forth, which will be understood by reference to the annexed drawings, in which—

Figure 3:
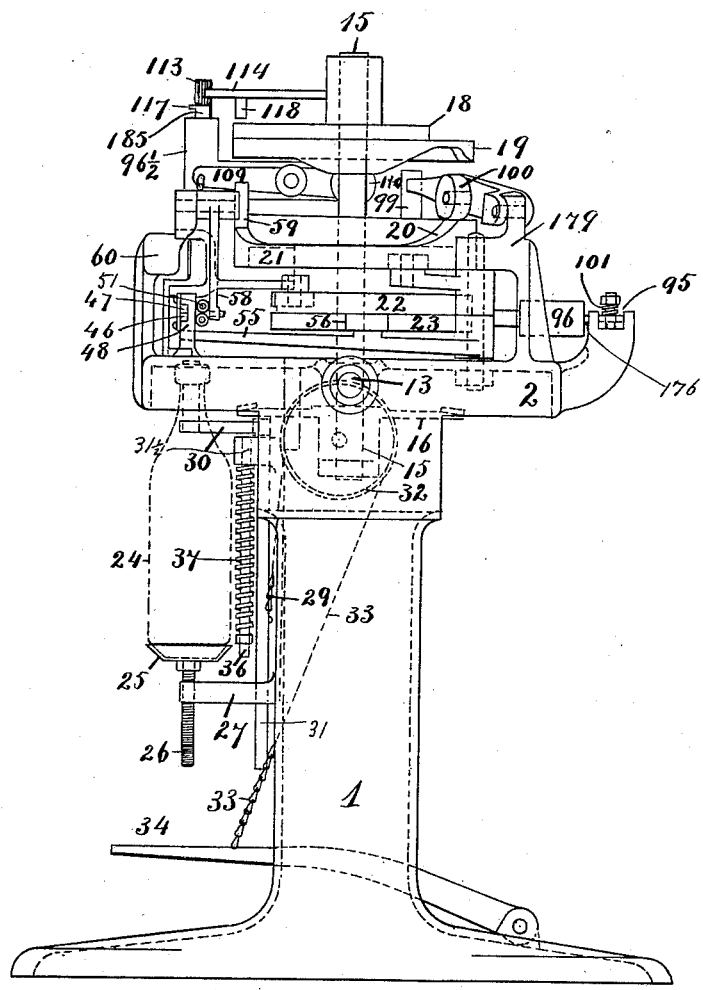
Figure 5:
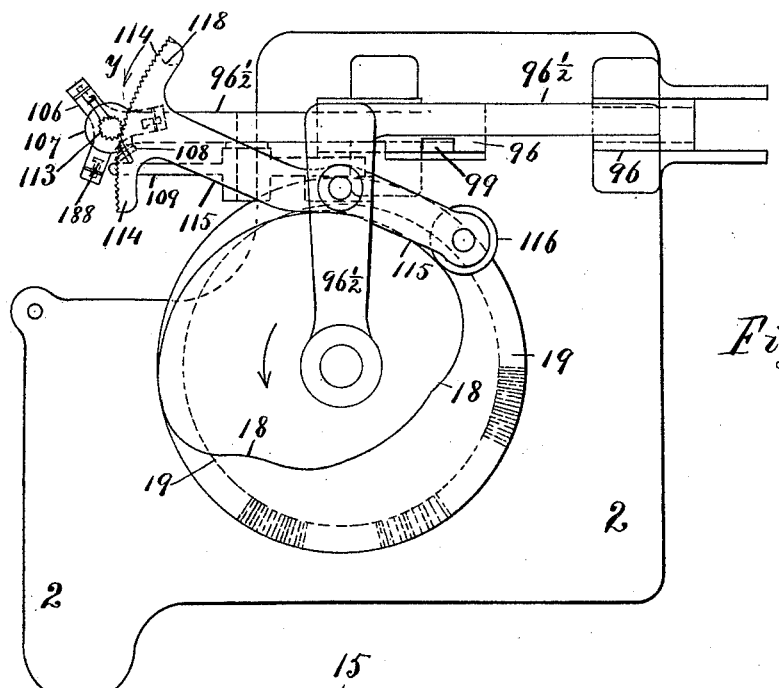
Figure 4:
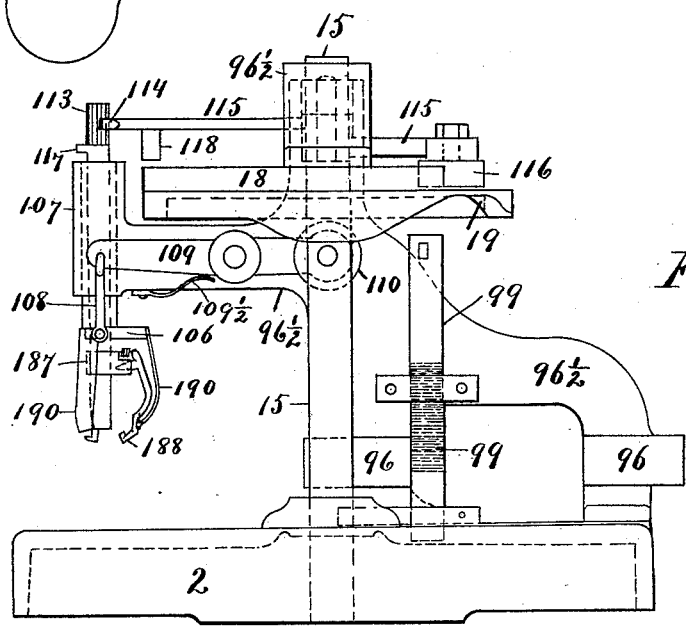
Figure 12:
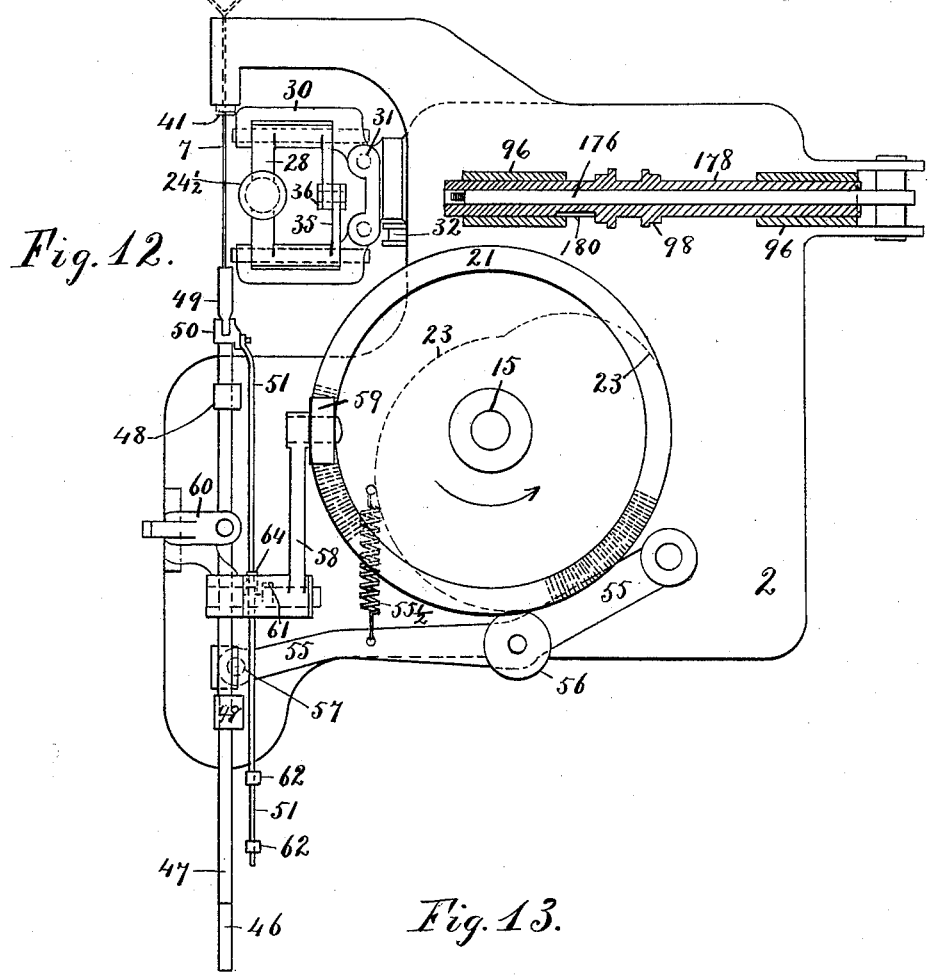
Figure 13:
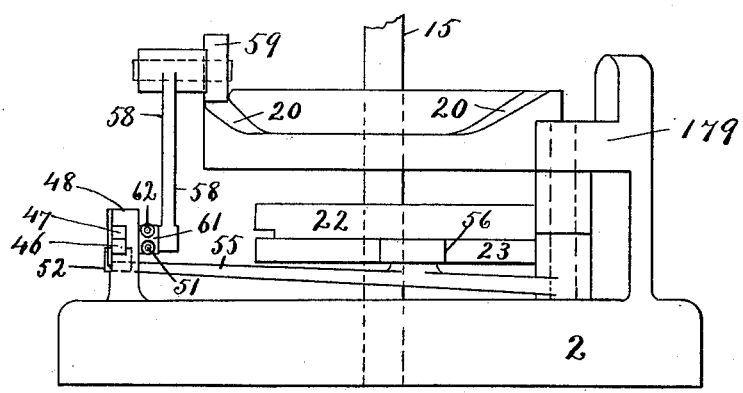
Figure 24A:
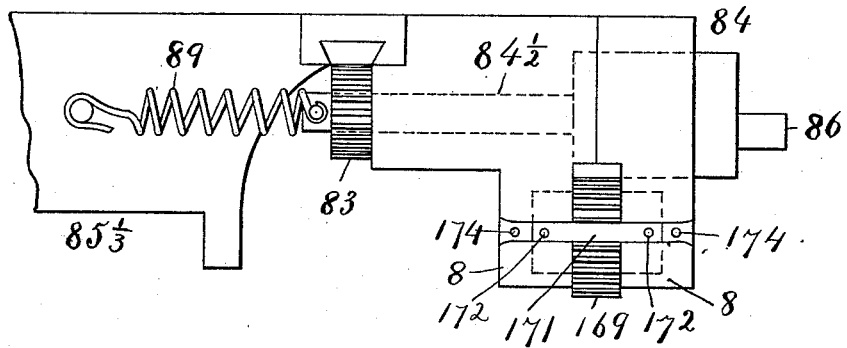
Figure 17A:
Figure 15B:
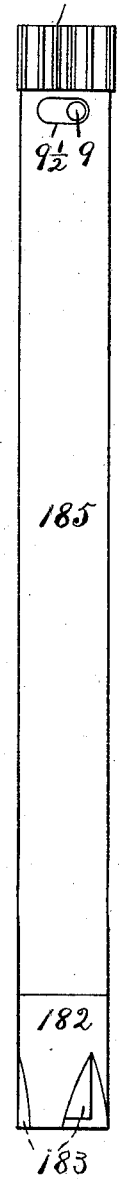
Figure 31:
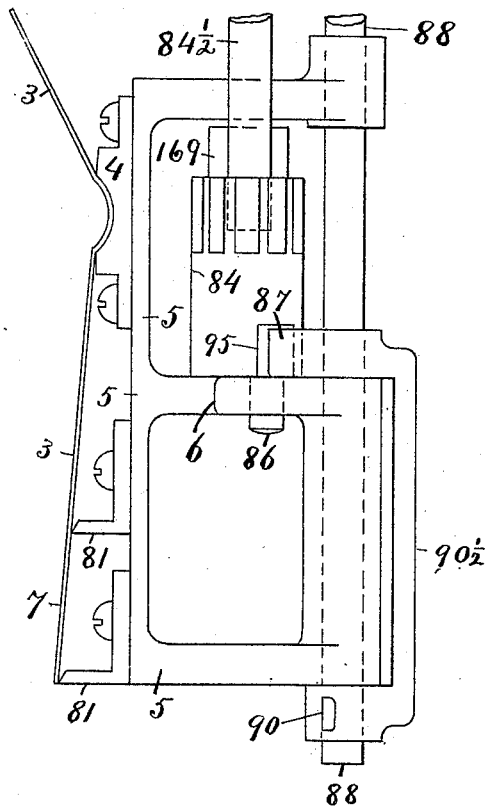
Figure 32:
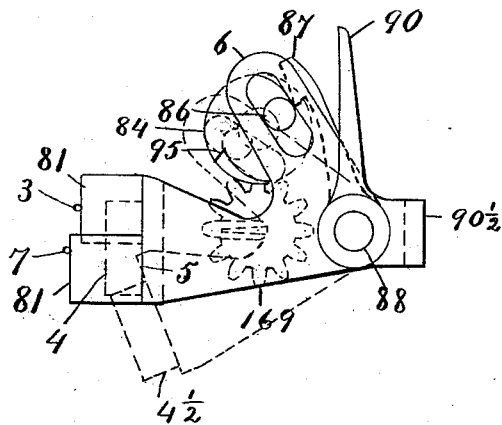

Figure 1 is a front elevation of the machine. Fig. 2 is a plan of the devices for twisting the two wires when drawn from the reel and cutting off the proper amount. Fig. 3 is an elevation of the machine, viewed from the right-hand side of Fig. 1. Fig. 4 is a side elevation of the bed-plate and the devices for twisting and cutting off the three wires gathered over the top of the cork. Fig. 5 is a plan of the bed with the same devices. Fig. 6 is a plan of the bed with the mechanism for feeding, twisting, and cutting off the two wires, and for drawing them around the neck of the bottle and twisting the opposite ends of one of the wires upon the rear side of the bottle-neck. Fig. 7 is a plan of part of the bed and clutch fixtures. Fig. 8 is a section on line $x$ $x$ in Fig. 7. Fig. 9 is a section on line $x'$ $x'$ in Fig. 7. Fig. 10 is a sectional view of the bed and driving gear-wheel on line $y$ $y$ in Fig. 7, with the clutch fixtures not shown in section; and Fig. 11 is a plan similar to that shown in Fig. 7 of the clutch-bolt, its shifting-cam, and the end of the lever for shifting the clutch-pin. Figs. 1, 2, and 3 are about one-sixth the natural size. Figs. 4 to 10 are one-fourth the natural size, and Fig. 11 is one-third the natural size. Figs. 12 and 13 are one-fourth the natural size. Fig. 12 is a plan of the bed and devices for feeding the wire, and Fig. 13 is a side view of the same. Fig. 14 is a view of the lower end of the devices for drawing the three wires up over the neck of the bottle, twisting them over the cork, and cutting them off. Fig. 15 is a section of the same on line $z$ $z$ in Fig. 14, and Fig. 15$^a$ a similar view with the nippers closed. Fig. 15$^b$ is a view of the sleeve 185 with the thimble 182 and pinion 113, showing the slot-and-pin connection between the sleeve and the cutter-spindle. Figs. 16 and 17 are a side view and top view of the twisting and cutting sleeve. Fig. 17$^a$ is a view of the bottom end of the thimble, with the cutter inside and the ends of the wires grasped as in the twisting operation. Fig. 18 is a side view of the rotary cutter, and Fig. 19 is an end view at the bottom of the same. Fig. 20 is a plan, Fig. 21 an end view, and Fig. 22 a side view, of the arm for carrying the devices for twisting and cutting off the two wires to form the cork-tie. Fig. 23 is an end view of the twisting-wheels and part of the rack for rotating the same. Fig. 24 is a side view of the twisting-wheels. Fig. 24$^a$ is a view of the bearings 173 for the ratchet and the notched pinion 169 upon the opposite side to that shown in Fig. 22, the arm 85½ being broken off adjacent to the bearing. Fig. 25 is an edge view of the clutch-sleeve for operating the back-twist nippers and for drawing and twisting the two ends of one wire around the neck of the bottle; and Fig. 26 is a plan, similar to that shown in Fig. 6, of the right-hand end of such fixtures. Fig. 27 is an edge view of the back-twist hooks and their shanks. Fig. 28 is a side view, similar to that shown in Fig. 1, of the two feeding-nippers. Fig. 29 is a view of the box upon the under side of one nipper-bar to receive the cam-lever. Fig. 30 is a plan of the left-hand end of the parts shown in Fig. 28. Fig. 31 is a plan of the pad, its attached cutters, and the pawl for locking the twisting-gear. Fig. 32 is an end view of the same. Fig. 33 is a side elevation of the wire-feeding devices and back-twist hooks, the nipper-bars being broken off, the twisted wire being shown in readiness to be grasped by the hooks to have its longer ends bent around the neck of the bottle, and the wire-dies being projected from their sockets by the springs within the same. Fig. 34 is a plan of the bottle-neck with the wires pressed thereon by the pad, and the back-twist nippers receding to pass the lower wire around the bottle-neck. Fig. 35 is a plan of the head of the back-twist nippers with the wires drawn around the neck of the bottle, ready to receive the back twist. Fig. 36 is a plan and Fig. 37 an elevation of the bottle-head and cork with the wire fully secured thereon. Figs. 15 to 33, inclusive, are drawn one-half the natural size.

It is immaterial whether the precise constructions which I have shown herein be employed to carry my invention into effect, as the essential feature of the invention is, the combination, in an organized machine, of feeding mechanism for drawing the wires across the neck of the bottle, mechanism movable to and from the wires to twist the same, a pad movable to and from the bottle-neck to hold the wires thereon while the ends of one of the wires are gathered around the bottle-neck, a back-twist nipper for drawing such ends around the bottle-neck and twisting them together, top-twist nippers movable to and from the top of the bottle to gather the wires upward over three points, and a twisting and cutting device operating to twist the wires and cut off their ends while held in the top-twist nippers.

1 is a standard; 2, a bed mounted upon the top of the same to support the mechanism; 13, a driving-shaft rotated by pulleys 14. 15 is a cam-shaft driven by bevel-wheels 16 and 17. 18 is a cam for rotating the wiring-nippers and the rotary cutter; 19, a cam for raising the wiring-nippers; 20, a cam which serves the double purpose of closing the feed-nippers and rotating the nippers which give the back twist to the wire. 21 is a cam for reciprocating the back-twist nippers; 22, a cam for vibrating the arm upon which are the wire-cutters, the pad for pressing the wires to the bottle-neck and for rotating the twisting-gear, and 23 is a cam for the feed-nippers. The cams are shaped and secured upon the shaft 15 in such manner as to actuate the feeding and twisting mechanisms as desired.

In the operation of the machine two wires are drawn (of different lengths) from reels, through suitable wire-cutting dies, by feeding-nippers, and while held in such nippers and wire-cutting dies are twisted, preferably, at two points, adjacent to their middle.

The bottle 24 is placed upon a plate or cup 25, adjustable by its stem 26 in a bearing 27, fixed to the standard 1. The cup is adjusted only when there is a large difference between the heights of different lots of bottles, as between quarts and pints. A lifting mechanism, to be hereinafter described, compensates for the common differences existing in the same class of bottles. The lifters 28 are pivoted at each side of the bottle-neck upon a head 30, carried by vertically-movable rods 31. A chain 29 is attached to the rods 31 and to the rim of a wheel 32, and a chain 33 is attached to the opposite side of such wheel and to a treadle 34. Each of the lifters 28 is formed with an arm 35, which is connected with a rod 36, drawn normally downward by a spring 37. The ends of the lifters are hollowed to fit the bottle-neck, and such spring operates to press the upper ends of the lifters normally together, as shown in Figs. 1 and 12, to grasp the bottle beneath the collar formed at its mouth, and operates, when the head 30 is raised by the depression of the treadle, to raise the under side of the bottle-head, as shown in Fig. 8, into line with the wires.

In Fig. 33 the wires 3 and 7 are shown conducted through a leader 38 and guides 39 into wire-dies 40 and 41. The wire-dies are formed with separate vertical faces formed in an offset piece of steel attached to the end of a plug 42, which is fitted to a socket 43, and pressed normally outward through the same by a spring 44. A stop-pin 45 regulates the protrusion of the wire-dies at the moment when the wire is severed flush with their faces.

The feed-nippers, as are also shown in Figs. 28 and 30, are formed of bars 46 and 47, having each a longitudinal seat $46\frac{1}{2}$ upon the end in line with one of the wire-dies, and are fitted in a guide-socket 48, and provided each with a jaw 49, pivoted upon the bar and pressed against a seat formed in the end of the same by dogs 50 and rods 51. The dogs, as shown in Fig. 30, are pinned to the tails of the levers 49, and are formed each with a shoulder $50\frac{1}{2}$, adapted, when the rod 51 is pushed toward the jaw, to seat itself upon the outer side of the bar and clamp the end of the jaw firmly upon the seat $46\frac{1}{2}$.

As shown in Figs. 28 and 1, the bar 46 is provided upon its under side with a notched block 52, by which it is reciprocated with a fixed movement.

The wires, as shown in Fig. 33, are designed to be of different lengths, the longer wire being carried entirely around the neck of the bottle and secured by a back twist, while the shorter wire after twisting has its ends carried directly upward and bent over the top of the cork. For this reason the wire-die 40 is set farther from the nippers than the wire-die 41, and the bar 47 is actuated with a shorter stroke than the bar 46, which is effected by forming a longitudinal recess 53 in the side of the bar 47, and applying a block 54 to the other bar to fit therein, but not filling it lengthwise.

A lever 55 carries a roller 56 in contact with the cam 23, (see Fig. 12,) and is provided at its vibrating end with a pin 57, fitted in a notch in the block 52, and a spring $55\frac{1}{2}$ retracts it. When the feed-nippers are advanced toward the wire-dies, the rods 51 are retracted by the tension of a spring $58\frac{1}{2}$, attached to a bell-crank 58, carrying a roller 59 in contact with the cam 21. (See Fig. 12.) The bell-crank is pivoted upon a bracket 60, fixed upon the edge of the bed 2. Such retraction is effected by a block 61, pivoted on the lever 58 and adapted to come in contact with collars 62 and 64 upon the rods 51.

The feed-nippers are shown retracted in Figs. 1, 12, and 33, with the full length of wire drawn from the wire-dies, and at such time the collars 64 are in contact with the forward side of the pivoted block 61 and operate to open the nippers to release the wire. The pivoting of the block 61 avoids an accurate adjustment of each collar 64 to produce an equal pressure or grip of both jaws 49 upon their respective wires, as the block is adapted to tip toward either collar upon its pivot, and thus serve as a compensator for any want of adjustment. The forward movement of the feed-bars to draw a fresh charge of wire from the dies brings the collars 62 in contact with the rear side of the compensator, which operates to close the nippers, as required, to grasp the wire. The bar 46 is pressed at the proper time toward the wire-die 40, carrying with it the bar 47, which is pressed positively upon the die 41 by the contact of the block 54 with the end of the recess 53, and presses the plug 42 inward and carrying therewith both of the wire-dies. The bar 46 at the same time forces the other nipper against the wire-die 40. When the wire-dies are thus pressed back, the wire is held by frictional contact in the guides 38 and 39, and the wire projects from the dies and enters the open nippers. The wire-nippers are then closed by the action of the cam 21 upon the bell-crank 58 and collars 64, and the cam 23 then operates through lever 55 to retract both the nippers and draw the wire out the proper distance, as shown in Fig. 33. The wire is thus drawn out, and is twisted before the bottle last wired is released from the grasp of the lifters 28, and the twisted wire is then in a condition to receive another bottle. The rods 31 are fitted in a guide 31½, fixed upon the bed 2, and a shoulder is formed upon the spring-rod 36 adjacent to the arms 35, which, when the head 30 is dropped, strikes the guide 31½ and opens the lifter-jaws to receive the bottle-neck. A bottle is then placed upon the cup 25 and the treadle depressed to rotate the wheel 32 to lift the bottle into position for wiring. The treadle, when depressed its full stroke, rotates a lug 65 upon the wheel into contact with a catch 70 and clutch-lever 66, the catch serving to hold the wheel in a given position during the wiring of a bottle, while the lever serves to throw a clutch attached to the shaft 15 into the bevel-wheel 16, and thus sets the entire machine in operation. The construction of these devices is clearly shown in Figs. 7 to 11, the clutch-hub, which is attached to the shaft 15, being provided with a longitudinal slot containing the clutch-bolt 71 and with a cam-face 67, adapted to operate upon a lever 68 in opposition to spring 68½ when the bottle is wired, to lift the latch from the lug 65. For this purpose the latch 70 is provided with an arm 69, having a sloping end extended in the path of the lever 68, so that the lever (moving in the direction of the arrow $x$ in Fig. 8) is pressed underneath the arm and lifts the latch from the lug 65. Upon the release of the lug the wheel 32 is rotated backward by the weight of the bottle and the pressure of the spring 37, and the bottle is dropped upon the cup 25. The head 4½ of the bolt 71 is notched, as shown in Fig. 9, and a spring 72 presses it normally toward a recess 73 in a hub of the bevel-wheel 16, which is continuously rotated by the pulleys 14. The bolt is therefore held in the pulley to rotate the shaft 15, except it be withdrawn by the lever 66, which has one end provided with an incline 66½, pressed normally toward the notched head of the bolt by a spring 67½. An annular shoulder 74 is provided upon the clutch-hub, and the incline 66⅓ is supported upon such shoulder and held always upon the same side of the shaft 15, and as it lies in the path of the bolt-head during the rotation of the clutch it operates automatically when wedged underneath the head of the bolt to draw the same from the recess 73, and to thus stop the machine at the completion of each bottle-wiring operation.

The lifters are shown elevated in Fig. 8, with their upper ends upon a line with the upper wire 3 and the collar 24½, forming the head of the bottle, resting upon the top of the lifters. As the lifters are always held at the same height by the latch 70, and as the wires are always held in the same path by their dies and nippers, it is evident that the wire would always be applied to the neck of the bottle directly under the head, regardless of the variations that might exist in the size or depth of the head. The suspending of the bottle by the under side of the collar 24½ upon the tops of the lifters thus affords a perfect compensation for the variations in the depth of the bottle-heads and length of bottles below the heads and secures the application of the wire to the neck exactly beneath the head in all cases. The wheel 32, in conjunction with the latch, the clutch, and the levers 66 and 68, thus operates to hold the bottle in the required position during the process of wiring, and to automatically stop the movements of the machine by unclutching the shaft 15 from the rotating wheel 16 when the bottle is completely wired. The wires, when drawn across the neck of the bottle by the nippers, or before they are released or severed from the wire-dies, are twisted for a given space in the middle and such twisted portion pressed upon the neck of the bottle by a pad. The mechanism for forming such front twist is mounted (see Figs. 2, 6, and 34) upon a vibrating arm 85⅓, pivoted upon the bracket 60, and the arm is vibrated by a spring 94 and cam 86⅓, operating by roll 87⅓ upon a lever 88⅓.

The fixtures mounted upon the arm are shown in detail in Figs. 20 to 24, inclusive, and consist in a twister 169, to form the front twist in the middle of the wires, a pad 4 to press the twisted portion of the wires against the neck of the bottle, and cutters 81, adapted to sever the two wires at the faces of their respective dies. A rack 82 is fitted transversely in the arm 85⅓ and operates upon a pinion 83 upon the end of a shaft 84½, to rotate a wheel 84, which is provided with ratchet-teeth 95 and a crank-pin 86. The lever is connected with the arm 85⅓ by a slotted link 89½. The rack is reciprocated in the arm by a projection 92, formed upon the cam-lever 88⅓, the movement of the lever being continued after the arm is arrested by a stop 80 upon the bed. The arm 85⅓ is pressed normally away from the lever by a spring 93; but when the arm is arrested by the stop the movement of the lever continues and operates upon the rack alone. A spring 94 operates to draw the lever inward, and through the medium of the slotted link 89⅓ presses the arm 85⅓ toward the bottle-neck at the proper time, and thus presses the pad against the same to hold the wires thereon until they are cut and wound about the neck of the bottle. The shaft 84½, when rotated by the rack, operates to twist a spiral spring 89, and a pawl 87, hinged upon a spindle 88, serves to lock the wheel 84 when the spring is twisted and to hold it under the tension of the spring until the pawl is lifted.

The pad 4 is formed upon a seat 5, which carries the cutters 81, and the seat is hinged upon the spindle 88 and provided with a slotted arm 6, fitted to the crank-pin 86. The teeth upon the wheel 84 mesh with teeth upon a pinion 169, which is formed with the open notch 171 in its side to operate as the front twister for the wires 3 and 7. The pinion is formed with a hub at each side, supported in bearings 8, adjacent to the shaft 84½ and spindle 88, which bearings are also formed with open notches which line with the notches 171 when the pinion is turned into its operative position, as shown in Figs. 21 and 23, and locked therein by the operation of the pawl upon the ratchet 95. The notches in the pinion and bearings are flared, as shown in Fig. 21, to guide the two wires, which lie in two planes—one above another—into the notch, and pins 174 are formed in the bearings to keep the wires separated during the formation of the front twist and to determine the length of the twisted portion. Pins 172 are also provided in the pinion-notch to hold the wires apart and wind them about one another, to form the twist when the pinion is rotated. The notch in the pinion is held in line with the wires when the arm 85⅓ is pressed toward the same at a suitable time, and when the notch is fully pressed over the wires the pawl 87 is released from the ratchet, and the spring 89 is permitted to operate and rotate the pinion to twist the wire, as desired. The release of the pawl is effected by a finger 90, which is connected therewith by a tie-bar 90½, as shown in Figs. 31 and 32, and which comes in contact with a stop 91 upon the socket 43, (see Figs. 1 and 6,) the finger and the pawl being rotated slightly upon the spindle 88 in such operation, and the pawl being pressed normally toward the ratchet by a spring 6½.

The pad is constructed to operate upon the wires at the same point as the front twister, and to effect this object and to avoid the interference of these two agencies with one another the seat upon which the pad and cutters are fixed is vibrated up and down at the proper time by the rotation of the crank-pin 86 in the slotted arm 6.

Fig. 32 shows the pad in dotted lines 4½ lowered so as to permit the advance of the arm to apply the notched pinion 169 to the wires during the twisting operation; but the rotation of the wheel 84, when the pawl releases the ratchet, moves the crank-pin 86 and elevates the pad into a line with the wires, as is indicated by the full lines in Fig. 32.

The cam 86¼, as shown in Fig. 2, is provided with projections 86⅓, adapted to move the arm 85⅓ backward when the pad is thus lifted, and permit its subsequent advance to press the pad upon the bottle-neck. When thus advanced, the cutters 81 encounter the wire at the faces of the protruded wire-dies 40 and 41 and serve to sever the wire just as the pad presses the twisted portion upon the bottle-neck. The effect of the pins inserted in the notched twisting-pinion is to form an open loop between the two twists, as shown in Fig. 33, and the pad may be made of wood, rubber, or any other suitable material, and adapted to press upon such loop and hold it firmly upon the neck of the bottle under the tension of the spring 94. The feed-nippers are, simultaneously with the cutting of the wires, released from the wire by the operation of the lever 58 and the collars 62, and the lower wire 7 is in readiness to have its ends drawn behind the neck of the bottle by the back-twist nippers, as shown in Fig. 34. The ends of these nippers are provided with hooks having inclined ends, as shown in Fig. 27, which press the wire upward as they pass under the same. The hooks are shown in such position in Fig. 6, with the lower wire caught upon the front of the hooks, and are retracted at the same time that the pad and cutters are advanced, the movement of the back-twist nippers being then continued, so that the wires when released from the wire-dies and feed-nippers are drawn around the neck of the bottle and their ends brought together between the nipper-jaws, as shown in Fig. 35. The inner sides of the nipper-jaws are provided with notches, (indicated in dotted lines 8½ in Figs. 26 and 27,) into which the wires are led by the form of the hooks, and the two wires are thus brought into close contact with one another, as shown in Fig. 35, behind the neck of the bottle, and held in position for twisting together.

The back-twist nippers are constructed with jaws 175, pivoted at their inner ends to a rod 176, fitted to move freely within a sleeve 178, which is provided with a fork 177, the outer ends of which have rollers 102 fitted against shoulders or offsets bent in the jaws, and thus operate partly to press the jaws together while drawing them backward in opposition to a spring 8¼, Fig. 26. The sleeve 178 is fitted to bearings 96 upon the bed 2, and is moved transversely to the bottle-neck by a lever 179, pivoted upon bearings 179½, supported upon the bed and having a roller 97 in contact with the cam 21. The end of the lever is pivoted by a suitable coupling to collars 98, fixed upon the sleeve, and pinion-teeth 180 are formed in the sleeve adjacent to the collars and fitted to a rack 99, which is reciprocated by a lever 181, having a roller 100 fitted to the cam 20. The rack is shown, with the bearings 96, held in a bracket 96½, (see Figs. 4 and 5,) and the rod 176, which is shown formed in two parts, moves loosely in the sleeve, projects from the end of the sleeve, and is fitted to friction-clamps 95, pressed together, as shown in Fig. 3, by springs 101. The inner sides of the jaws 175 lie nearly parallel when they first grasp the wire, as shown in Fig. 6, and the retraction of the fork and rollers 102 operates first to press the inner sides of the jaws upon the bottle-neck and afterward to draw them backward until the hooks rest upon the rear side of the bottle-neck. The continued pressure of the rollers upon the shoulders then forces the hooks inward, as shown in Fig. 34, and retains the wires in close contact with the neck of the bottle, the hooks following its contour until the ends of the wires are brought together between the nippers, as shown in Fig. 35. The friction of the clamp 95 upon the rod 176 tends to hold the jaws toward the bottle-neck and necessitates a positive pressure from the rollers to move the jaws backward, and thus secures the pressure upon the shoulders of the jaws which is necessary to force them together to draw the wires behind the neck of the bottle, as shown in Fig. 34. Pins are formed upon the inner sides of the jaws, and a spring 8¼ is applied thereto to hold the jaws normally separated. When the wires are gathered together behind the neck of the bottle, as shown in Fig. 35, they are ready for the back twist, which is immediately effected by the reciprocation of the rack 99 upon the pinion 180, attached to the sleeve 178. When such rotation is effected by the action of the cam 21 and lever 181, the jaws are held upon the wires by the rollers, as shown in Fig. 35; but immediately thereafter the sleeve is moved forward by the action of the cam 21, while the rod 176 is held stationary by the clamp 95. The rollers immediately clear the shoulders upon the jaws and the spring 8¼ operates to open the same. The pad meanwhile has been removed from the wires by the retraction of the arm 85, and the ends of the wire 2 then stand at one hundred and twenty degrees from the twisted wires 7, as shown in Fig. 35, in readiness for the top-twist nippers to operate. These nippers and the top cutters are shown in detail in Figs. 14 to 18, inclusive, and connected with their operative mechanism in Figs. 4 and 5. These nippers are formed, like the back-twist nippers, of jaws having external shoulders, and are operated in like manner by an independent longitudinal movement of the arms in contact with their shoulders. By such construction the hooks upon the ends of the nippers are adapted to grasp the three wires (shown in Fig. 35) which are to be drawn above the top of the bottle and to press them inward in contact with the head of the bottle, and, when the top of the head and cork are reached, to gather them together to be twisted. A hollow thimble, with three notches in its sides and having a notched plug rotated in its interior, is sustained in the path of the wires above the cork when thus gathered together, and operates first to twist the wires while held in the grasp of the nippers, and finally to cut off their surplus ends when the twist is completed. The thimble 182, formed with the notches 183, is secured upon the lower end of a sleeve 185, and the top-twist nippers 188 are pivoted each with an arm 103 in a recess 104 in a collar 187 and pressed normally outward by springs 105. The recesses 104 are flared outwardly to permit the movement of the arm 103 through the required angle, and the upper side of the recess, by contact with the arm, serves to limit the outward movement of the nipper-hooks, as shown in Fig. 15. Such limit would be regulated to permit the movement of the hooks over a bottle-head of the largest size, such as is shown at 24½ in the drawings. The pressers 190 are attached to a head 106, secured upon the lower end of a tube 189, and press upon shoulders 191 on the nipper-levers. The tube 189 is fitted to a bearing 107 in the bracket 96½, Fig. 4, and is moved vertically therein by a link 108 and a lever 109, (pivoted also on bracket 96½,) having a roller 110 pressed upon cam 19. A spring 109½ holds the lever 109 normally upward. The vertical movement of the tube operates through the forked arms 190 and the shoulders 191 to raise the nippers and their collar 187 gradually upward when the bottle-head is between them. The collar 187 is fitted to move longitudinally upon a feather 119 on the thimble, and is constructed to strike a shoulder 186 upon the thimble-sleeve 185 just before the tube reaches the upward limit of its stroke, and the thimble is thus lifted sufficiently above the cork 111 to permit the nipper-hooks to slip inward between the top of the cork and the bottom of the thimble, as shown in Fig. 15ª. When the collar is lifted into contact with the shoulder 186 to wholly clear the feather 119, as shown in Fig. 15ª, the sleeve 185 may thus be rotated to twist the wires and actuate the cutter without turning the top nippers and their springs 190. The hooks 188 remain in the position shown in Fig. 15ª and hold the wires bunched together upon the top of the cork while the wires are twisted and cut off by the thimble 182. The link 108, which connects the head 106 with the arm of the lever 107, is made of bent wire and formed of loose joints to permit the slight rotation of the head 106, and when the collar 187 is lowered into contact with the feather 119 the top-twist nippers 188 may therefore be slightly rotated by a movement of the sleeve 185 without hinderance from the link. The thimble, as shown in Figs. 16 and 17, is a hollow shell with thin flat bottom and three notches 183 formed in the sides and bottom, into which the wires are gathered by the nipper-hooks, and the cutter-head 184 is formed with similar notches, which coincide, as shown in Fig. 14, with the notches in the thimble while the wires are being gathered therein. The cutter-head is attached to the bottom of a spindle 112, fitted within the thimble-sleeve, and is provided with a pinion 113 at the top, connected, as shown in Figs. 4 and 5, with a toothed rack or segment 114, rotated by a lever 115 and a roller 116 pressed upon the cam 18. The rotation of the cutter-head within the thimble operates to crowd the wires against the sides of the notches 183, and thus grips the wires and twists the same together above the cork in the required manner. Fig. 17$^a$ shows the sleeve and cutter in such position, the sleeve receiving no movement except as the wires 3 and 7 are pressed against the sides of the notches 183 by the rotation of the cutter-head. The twisting movement is so performed as to release the wires from the hooks of the nippers 188 and to twist the wires between the top of the cork and the bottom of the cutter-head at the point where they are delivered by the hooks. To sever the wires above such twisted portion, it is only necessary to arrest the movement of the thimble and to continue the rotation of the cutter-head within the same. Such operation is effected by means of a projection 117, formed upon the sleeve and adapted, when the segment 114 has nearly reached the limit of its movement, (in the direction of the arrow $y$ in Fig. 5,) to rotate into contact with a stop-pin 118, formed upon the under side of the segment. The movement of the segment is continued through a small space after the rotation of the sleeve is arrested, and actuates the cutter-head a sufficient distance to sever the surplus ends of the wire, as desired. The cam 19 is constructed to then lower the tube 189, upon which movement the forked arms 190 are slipped off of the shoulders 191, and the hooks 188 are immediately separated by the springs 105.

A slot $9\frac{1}{2}$ is formed in the sleeve 185, as shown in Fig. 15$^b$ to receive a pin 9, fitted in the spindle 112, and is so proportioned as to merely permit the rotation of the cutter-head within the sleeve a sufficient distance to sever the wires, while the pin operates, when the motion of the segment 114 is reversed by its contact with one end of the slot in the sleeve, to turn the sleeve back to its initial position. Such readjustment of the spindle is made that the keyway in the collar 187 may engage with the feather 119 when the top-twist nippers are again lowered to grasp the wires and draw them above the top of the cork.

The cam 18, which operates the segment 114, is so constructed as to slightly turn the spindle 112 when the hooks 188 are in their lowest position, and the spindle thus operates through the contact of the pin 9 with the end of the slot $9\frac{1}{2}$, and the engagement of the feather 119 with the collar 187 to slightly rotate the hooks at such time to engage them with the wires before the cam 19 operates to raise the top-twist nippers. During the rotation of the top-twist nippers and the cutting off of the surplus wire the cam-shaft 15 has made nearly one complete revolution from the position in which it started, and the head 4 of the clutch-bolt 71 is immediately afterward engaged by the incline $66\frac{1}{2}$ upon the lever 66, and the rotation of the cam-shaft is arrested by the withdrawal of the bolt from the driving-wheel 16. The cam 67 simultaneously actuates the lever 68 and lifts the latch 70, thus permitting the wheel 32 to rotate backward and the bottle to drop with the lifters 28 until the bottle rests on the cup. The shoulder upon the spring-rod 36 then strikes the guide $31\frac{1}{2}$, when the lifter-jaws open and the bottle is released. As before stated, the wires are drawn out by the feed-nippers and the front-twisting wheel is set and locked by the pawl 87 in position for operation, while the wires are undergoing the final twisting operation, and when too long being cut off above the cork, and the machine is thus in condition to receive another bottle as soon as the bottle last wired is removed from the cup. When a fresh bottle is inserted in the lifters, the actuation of the treadle to raise the under side of the bottle-head to a level with the wires serves to rotate the wheel 32 and to set the clutch in operation, as before, after which the operation of wiring the bottle is automatically performed and the machine stopped when the operation is completed.

It will be readily understood from the above description that all the mechanism described is self-adjusting within the desired limits to bottles of different sizes, as to quarts and pints of the same class of bottles, or to the variations existing in the diameter of the neck or of the collar which forms the head of the bottle, or of the depth of such collar, or the protrusion of the cork therefrom. Such automatic adjustment is effected in the first instance by drawing the wires from the wire-dies of sufficient length to suit a bottle-head of the largest size, the cutter-head 184 operating to cut off the surplus wire just above the twisted portion in all cases.

The difference in the length of the wires 3 and 7 is made about equal to two-thirds of the circumference of the largest bottle-neck, as the lower wire 7 is designed to encircle the neck before it is carried upward over the top of the cork, while the ends of the wire 3 are carried directly upward from the ends of the front twist, which is equal in length to one-third way around the neck, and the automatic adjustment of the twisting-nippers is such as to fit the wires closely to the neck and top of the bottle whatever variations may exist in their size. This adjustment is effected by the actuation of the nippers indirectly by the pressure exerted upon their external shoulders, and which leaves them free to yield inwardly until in contact with the bottle, and to afterward move in the same direction as the forked arms until the obstruction to their inward movement is removed. They are then pressed inward by the forked arms, following the contour of the bottle neck or head, until they have drawn the opposite wires together, when the wires are in position for the twisting operation, which is effected by the rotation of the hooks in the case of the back-twist nippers, and with the assistance of the notched thimble in the case of the top-twist nippers. It will be understood that such self-adjusting quality is a feature alike of the back twist and of the top-twist nippers, in both of which the hooks, after grasping the wire, are pressed upon the bottle to draw the wires over the surface of the same to the point where their opposed ends may be twisted together. In both the nippers the primary effect of the forked arms upon the shouldered arms is to press the free ends of the jaws inward; but as soon as the jaws touch the bottle their inward movement is arrested, and the jaws can only move longitudinally—that is, in the direction of the fork-carrying sleeve. The pressure of the forked arms upon the inclined shoulders of the jaws operates, however, to press the jaws farther together as soon as the shape of the bottle permits, and the jaws thus serve to draw the wires together at the intended point, independent of any variations that may exist in the size of the bottle.

The variations in the height of the collar $24\frac{1}{2}$, which forms the bottle-head, do not prevent the uniform application of the wires to the under side of such collar, nor the application of any of the nipper-jaws to such wires at such level, for the reason that the horizontal movement of the back-twist nippers and the vertical movement of the top-twist nippers is adjusted exactly to the level of the wires when stretched across the neck of the bottle and twisted, as shown in Fig. 33.

The wire-fastening formed by my machine is one that has been heretofore made exclusively by hand, and I am not aware that any organized machine has ever been devised for twisting two wires together, carrying the ends of one around the bottle-neck and twisting them, and afterward gathering the wires together from the sides of the bottle-head to the top of the cork and twisting and cutting them off.

It will be readily seen that it is not material to the operation of the top-twist nippers how the wires are twisted together in front of the neck and two of their ends twisted upon the back of the bottle-neck. Neither is it material to the operation of the back-twist nippers how the wires are held across the neck of the bottle, nor the twist formed near the middle of the same; and it will therefore be obvious that the mechanism which I have devised for effecting each of the separate operations might be used to effect the same operation in some other machine, and I do not, therefore, limit myself to the use of all my devices in conjunction, but consider that each of the particular mechanisms which I have devised—as, for instance, that for forming the back twist and that for gathering the wires upon the top of the cork and twisting them together—is my own invention, and is claimed by me as such.

If the bottle-lifters be actuated directly by the operator, as in the construction shown, it is also immaterial whether the movement be effected by the operator's hand or foot, or whether a lever be used, as in the case of the treadle 34, or whether some other convenient means be used to raise the lifters when the bottle is inserted in them, as the true function of the lifters is merely to hold the bottle in position when the wire is applied to the neck.

It will be noticed by reference to Fig. 1 that, although the lifter-jaws 28 grasp the bottle-neck at the very point where the wires are wound around the same and sustain the whole stress upon the bottle-head during the wiring operation, the jaws do not interfere with the fitting of the wires to the neck, owing to the acute inclination of the jaws to the bottle-neck and the hollowing of the jaws to fit partly around the neck below the collar $24\frac{1}{2}$, which a few points only of the jaws really touch. The bottle is thus sustained in the desired position without hinderance to the movements of either the back-twist nippers, the pad, or the top-twist nippers.

I am aware that in apparatus for straightening and cutting wire it is common to use a reciprocating cross-head with clamps to draw wire from a wire-guide, and that a cutting-die movable with an actuating-rod has been used in connection with a cross-head and moved to its operative position by the contact of the cross-head with a collar upon such rod. I hereby disclaim any such construction. In my invention the cutting-die is held in its normal position by the spring 44 and the stop-pin 45, and requires no actuating-rod or connection with a cross-head or other reciprocating device.

Having thus set forth my invention, what I claim herein is—

1. In a machine for wiring corks in bottles, the combination, with feeding mechanism arranged to draw two wires across the neck of the bottle, of mechanism for twisting the wires near the middle of their length, a pad movable to and from the bottle-neck to press the wires thereon, back-twist nippers with two hooks extended along the opposite sides of the bottle-neck to draw two of the wire ends behind the neck, and rotary to twist the same together, top-twist nippers reciprocatory to and from the top of the bottle and having hooks adapted to grasp the wires and draw them together upon the top of the cork, a rotary sleeve and cutter to grasp the wires and twist the same, and connected mechanism for operating the several mechanisms in due order, as and for the purpose set forth.

2. In a machine for wiring corks in bottles, the combination, with wire-cutting dies arranged to hold a wire therein, of wire-feeding nippers, the nippers and cutting-dies being movable in relation to one another and arranged to draw the wire across the bottle-neck, twisting mechanism movable to and from the path of the wires, a pad and cutters movable to and from the bottle-neck, and mechanism for operating the pad and cutters to simultaneously sever the wires at the cutting-dies and to press the twisted portion of the wires upon the bottle, as and for the purpose set forth.

3. In a machine for wiring corks in bottles, the combination of a yielding cutting-die with a wire guide or guides held stationary in relation to such movable die, the cutting-die being sustained upon the guide, pressed away from the same by a spring, and its stroke limited by a stop 45, as and for the purpose set forth.

4. In a machine for wiring corks in bottles, the combination, with two wire-guides and two yielding wire-dies, of two nippers reciprocated to and from the dies, one of the nippers being projected beyond the other, and connected mechanism operating to open the nippers, when pressed against the dies, to admit the wire projected therefrom, and to close the nippers, when retracted from the die, to grasp and draw the wire therefrom, as and for the purpose set forth.

5. In a machine for wiring corks in bottles, the combination, with suitable devices for stretching the wires across the neck of the bottle, of back-twist nippers provided with two hooks movable to and from the path of such stretched wires, and connected mechanism for pressing the hooks toward the neck of the bottle while retracted to draw the wires together behind the same, and for rotating the hooks to twist the wires together, as and for the purpose set forth.

6. In a machine for wiring corks in bottles, the combination, with suitable devices for stretching two wires across the neck of the bottle, for twisting them together, and for twisting two of the wire ends behind the neck of the bottle, of top-twist nippers provided with three hooks and reciprocatory to and from the path of the wires, rotary cutters adapted to receive the wires from the three hooks, and connected mechanism for reciprocating the hooks to and from the path of the wires, for pressing the hooks together while drawing the wires above the top of the bottles, and for rotating the cutters to twist the ends of the wires, as and for the purpose set forth.

7. In a machine for wiring corks in bottles, the combination, with suitable devices for applying and twisting the wires upon the bottle-head, of lifters fitted to the under side of the bottle-head and adapted to grasp the neck of the bottle, and connected mechanism operating to elevate the lifters and raise the lower side of the bottle-head to a fixed point, as and for the purpose set forth.

8. In a machine for wiring corks in bottles, the combination, with devices for holding the wires transversely to the bottle-neck, of a combined bottle lifter and gage having jaws fitted to the neck of the bottle and sustaining the weight of the same by contact with the under side of the head, and connected mechanism operating to reciprocate the lifter to and from the wires, as and for the purpose set forth.

9. In a machine for wiring corks in bottles, the combination, with two reciprocatory feed-bars having different strokes and carrying nippers, of two yielding wire-dies adjusted at different heights in relation to the bottle, dogs carried by the feed-bars, and connected mechanism for operating the dogs to close the nippers upon the wires and for reciprocating the feed-bars to draw simultaneously from the dies two wires of different lengths, as and for the purpose set forth.

10. In a machine for wiring corks in bottles, the combination, with two feed-bars, one provided with a projection fitted to play in a recess in the other, of nippers provided with dogs and rods for closing the nippers, two yielding wire-dies opposed to the nippers, and connected mechanism for reciprocating one of the bars and for actuating the dogs to close the nippers, the whole being adapted to draw simultaneously from the dies two wires of different lengths, as and for the purpose set forth.

11. In a machine for wiring corks in bottles, the combination, with the movable head 30, having the lifters 28 pivoted thereon and provided with arms 35, of the stationary guide 31½, a rod with a spring operating beneath the guide to press the lifters normally together, a shoulder upon the spring-rod to open the lifters when lowered, and a treadle arranged and operated to lift the head 30, as and for the purpose set forth.

12. In a machine for wiring corks in bottles, the combination, with the movable head 30, having the bottle-lifters pivoted thereon, of the wheel 32, the treadle, the chains for rotating the wheel and raising the head 30, the lug upon the wheel 32, the hook 70, driving mechanism and a clutch connecting the same with the bottle-wiring devices, and a lever actuated by the lug for disengaging the clutch to start the machine when the treadle is depressed, as and for the purpose set forth.

13. In a machine for wiring corks in bottles, the combination, with the bottle-lifters pivoted in the movable head 30, and the devices for wiring the cork in the bottle, of driving mechanism, a clutch connecting the same with the bottle-wiring devices, the wheel 32, lug 65, hook 70, and clutch-lever 66, the cam 67, rotated with the clutch, the lever 68, and the inclined arm 69, for lifting the hook 70, the whole arranged and operated substantially as herein set forth.

14. In a machine for wiring corks in bottles, the combination, with lifters arranged to grasp the neck of the bottle and appliances for drawing the wire across the neck of the bottle, of means for raising the lifters into a line with the wire, substantially as herein set forth.

15. In a machine for wiring corks in bottles, the combination, with bottle-lifters pivoted upon the movable head 30, of devices for securing the wires upon the bottle-neck and cork, appliances for drawing the wire across the neck of the bottle, driving mechanism and a clutch connecting the same with the wiring devices, the wheel 32, a treadle and chains operated as described, clutch-starting mechanism actuated by a lug upon the wheel, and a hook for engaging the lug and retaining the ends of the lifters upon a level with the wire, as and for the purpose set forth.

16. In a machine for wiring corks in bottles, the combination, with wire-cutting dies and nippers for drawing the wire from the same, of a rotary wheel notched at one side and applied to the wire near the middle of its length, and connected mechanism for rotating the notched wheel to twist the wire, as and for the purpose set forth.

17. In a machine for wiring corks in bottles, the combination, with wire-cutting dies and nippers for drawing the wire from the same, of a rotary wheel notched at one side, mechanism for rotating the notched wheel to twist the wire, as set forth, a cutter for severing the wire at the wire-die, and a pad for pressing the wire upon the bottle-neck, substantially as described.

18. In a machine for wiring corks in bottles, the combination, with wire-cutting dies and nippers for drawing the wire from the same, of a rotary twister, mechanism for rotating the twister to twist the wire, as set forth, a cutter for severing the wire at the wire-dies, a pad for pressing the wire upon the bottle-neck, rotary back-twist nippers, and mechanism for operating the said nippers to draw the wire ends behind the bottle-neck and to twist them together, substantially as described.

19. In a bottle-wiring machine, the combination, with wire-dies and nippers for drawing the wire from the same, of a rotary wheel notched at one side to twist the wire, as set forth, a cutter for severing the wire at the wire-die, a pad for pressing the wire upon the bottle-neck, back-twist nippers to draw the wire ends behind the bottle-neck and to twist them together, top nippers for drawing the wire ends above the top of the bottle, a notched top twister to receive the ends of the wires and twist them upon the cork, and connected mechanism for operating the several mechanisms in due order, substantially as described.

20. In a bottle-wiring machine, the combination, with wire-dies and nippers for drawing the wire from the same, of a rotary wheel notched at one side to twist the wire, as set forth, a cutter for severing the wire at the wire-die, a pad for pressing the wire upon the bottle-neck, back-twist nippers to draw the wire ends behind the bottle-neck and to twist them together, two nippers for drawing the wire ends above the top of the bottle, a notched top twister to receive the ends of the wire and twist them upon the cork, cutters for severing the ends when twisted, and connected mechanism for operating the several mechanisms in due order, as and for the purpose set forth.

21. In a bottle-wiring machine, the combination, with wire-dies and nippers for drawing the wires therefrom, of the notched wheel 169, the cutters 81, a vibrating arm carrying the said wheel and cutters, and connected mechanism for vibrating the arm and reciprocating the wheel and cutters to and from the wires, as and for the purpose set forth.

22. In a bottle-wiring machine, the combination, with wire-dies and nippers for drawing the wires therefrom, of the arm 85⅓, the notched wheel 169, carried thereby, a pinion connected with the notched wheel, a rack movable transverse to the arm 85⅓, and connected mechanism operating to vibrate the arm to and from the wires and to reciprocate the rack in the arm, as and for the purpose set forth.

23. In a bottle-wiring machine, the combination, with wire-dies and nippers for drawing the wires therefrom, the arm 85⅓, the notched wheel 169, carried thereby, a pinion connected with the notched wheel, a spring to rotate the pinion, a rack movable transverse to the arm 85⅓ to rotate the pinion, a latch to hold the pinion when rotated in opposition to the spring, and connected mechanism operating to vibrate the arm, as and for the purpose set forth.

24. In a bottle-wiring machine, the combination, with wire-dies and nippers for drawing the wires therefrom, of the arm 85⅓, the notched wheel 169, carried thereby, a pinion connected with the notched wheel, a spring to rotate the pinion, a rack movable transverse to the arm 85⅓ to rotate the pinion, a latch to hold the pinion when rotated in opposition to the spring, a trip to disengage the latch, a stationary dog, and connected mechanism operating to vibrate the arm, as and for the purpose set forth.

25. In a bottle-wiring machine, the combination, with wire-dies and nippers for drawing the wires therefrom, of the notched wheel 169 and the cutters 81, mounted upon the swinging arm 85⅓, a pinion connected with the notched wheel, a rack movable transverse to the arm 85⅓, a stop to restrict the movement of the arm, and a lever linked to the arm 85⅓ and movable independently to reciprocate the rack, and connected mechanism operating to vibrate the lever, as and for the purpose set forth.

26. In a bottle-wiring machine, the combination, with wire-dies and nippers for drawing the wires therefrom, of the arm 85⅓, the notched wheel 169, carried thereby, a pinion connected with the notched wheel, a rack movable transverse to the arm 85⅓, a carrier pivoted upon the arm, a pad and wire-cutters fixed upon the carrier, a connection with the notched pinion to raise the pad and cutters into line with the wire, and connected mechanism operating to vibrate the arm 85⅓, as and for the purpose set forth.

27. In a bottle-wiring machine, the means for forming right and left hand twists adjacent to one another in the two wires, consisting in the bearings 173, provided each with pins 174, and the rotary pinion 169, provided with notch 171 and pins 172, and connected mechanism operating to rotate the pinion a complete revolution when engaged with the wires, as and for the purpose set forth.

28. In a bottle-wiring machine, the back-twist nippers consisting in the hooks 175, formed with bent arms, as described, and hinged upon the rod 176, a friction-clamp for such rod, the fork 177, fixed upon the sleeve 178, and connected mechanism to reciprocate the fork over the rod 176, as and for the purpose set forth.

29. In a bottle-wiring machine, the back-twist nippers consisting in the hooks 175, pivoted upon the rod 176, and the fork 177, fixed upon the sleeve 178, the cam-lever 179, for reciprocating the sleeve over the rod, the pinion 180 upon the sleeve, and a cam-lever 181, for rotating the pinion, as and for the purpose set forth.

30. In a bottle-wiring machine, the combination, with top nippers having hooks to draw the wires above the top of the cork, of the thimble 182, provided with notches 183 to receive the wires, and the cutter-head 184, notched to match the thimble and rotary within the same, and connected mechanism for operating the said parts in due order, as and for the purpose set forth.

31. In a bottle-wiring machine, the combination, with the notched thimble-sleeve formed with shoulder 186, of the collar 187, carrying the nipper-hooks 188, provided with inclined shoulders 191, the tubes 189, the pressers 190, carried upon the same to actuate the hooks, and mechanism operated to reciprocate the tube and raise the collar into contact with the shoulder 186 to lift the thimble from the cork, as and for the purpose set forth.

32. In a bottle-wiring machine, the combination, with a sleeve carrying a collar fitted to feather 119 upon the sleeve and provided with the top-twist nipper-hooks 188, of the notched thimble attached to the sleeve, a notched cutter and cutter-shaft rotary within the same, a slot and pin movably connecting the cutter-shaft and sleeve, a pinion upon the cutter-shaft, a rack or segment 114, and a cam and lever for actuating the rack to rotate the pinion, as and for the purpose set forth.

33. In a bottle-wiring machine, the combination, with a sleeve carrying a collar fitted to feather 119 upon the sleeve and provided with the top-twist nipper-hooks 188, of the notched thimble attached to the sleeve, a notched cutter and cutter-shaft rotary within the same, a slot and pin movably connecting the cutter-shaft and sleeve, a pinion upon the cutter-shaft, a cam-lever provided with a toothed segment to drive the pinion, a stop near one end of the segment, an arm projected from the sleeve to meet such stop, and a cam to vibrate the cam-lever, as and for the purpose set forth.

In testimony whereof I have hereunto set my hand in the presence of two subscribing witnesses.

BENJAMIN ADRIANCE.

Witnesses:
   THOS. S. CRANE,
   NATH. B. ABBOTT.